United States Patent
Liu et al.

(10) Patent No.: US 9,439,001 B2
(45) Date of Patent: Sep. 6, 2016

(54) ELECTRONIC DEVICE AND SOUND CAPTURING METHOD

(71) Applicants: Beijing Lenovo Software Ltd., Haidian District, Beijing (CN); Lenovo (Beijing) Co., Ltd., Haidian District, Beijing (CN)

(72) Inventors: Junfeng Liu, Beijing (CN); Yunfeng Pan, Beijing (CN); Fei Wu, Beijng (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 412 days.

(21) Appl. No.: 14/102,596

(22) Filed: Dec. 11, 2013

(65) Prior Publication Data

US 2014/0161287 A1    Jun. 12, 2014

(30) Foreign Application Priority Data

Dec. 11, 2012  (CN) .......................... 2012 1 0534037

(51) Int. Cl.
*H04R 25/00* (2006.01)
*H04R 17/02* (2006.01)
*H04R 19/04* (2006.01)

(52) U.S. Cl.
CPC .............. *H04R 17/02* (2013.01); *H04R 19/04* (2013.01); *H04R 2460/13* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,240,002 A | * | 12/1980 | Tosi | H04R 17/00 310/322 |
| 8,212,855 B2 | * | 7/2012 | Gupta | H04N 7/142 348/14.01 |
| 2006/0018488 A1 | * | 1/2006 | Viala | H04R 1/1091 381/74 |
| 2006/0055868 A1 | * | 3/2006 | Lee | G02C 5/00 351/43 |
| 2010/0110368 A1 | * | 5/2010 | Chaum | G02B 27/017 351/158 |
| 2010/0171680 A1 | * | 7/2010 | Lapidot | G02B 27/0172 345/8 |
| 2011/0224481 A1 | * | 9/2011 | Lee | G02C 11/06 600/25 |
| 2012/0104898 A1 | * | 5/2012 | Qu | H04R 19/005 310/319 |
| 2014/0029762 A1 | * | 1/2014 | Xie | H04R 3/00 381/94.1 |

OTHER PUBLICATIONS

Pic Lab-1, "The Piezo Diaphragm", pp. 1-8, Wayback machine date of Jun. 26, 2004.*

* cited by examiner

*Primary Examiner* — Duc Nguyen
*Assistant Examiner* — Assad Mohammed
(74) *Attorney, Agent, or Firm* — Brinks Gilson & Lione; G. Peter Nichols

(57) ABSTRACT

An electronic device and a sound capturing method are described. The electronic device includes at least one first bone conducting unit, which is operable to detect vibration produced by an object in contact with the first bone conducting unit, and to generate an alternating current signal based on the detected vibration to capture a sound produced by the vibration; and a processing unit, which is operable to receive the alternating current signal and to perform an audio processing on the alternating current signal.

18 Claims, 9 Drawing Sheets

ELECTRONIC DEVICE AND SOUND CAPTURING METHOD

BACKGROUND

This application claims priority to Chinese patent application No. 201210534037.3 filed on Dec. 11, 2012, the entire contents of which are incorporated herein by reference.

The embodiments of the present disclosure relates to an electronic device and a corresponding sound capturing method.

With the development of communication technology, various portable electronic devices such as the tablet computer, the smart phone, the game machine, and the portable multi-media player or the like, are widely used. However, the user generally needs to hold the electronic device by hand and keep a certain gesture to operate the electronic device or view the content displayed on the electronic device, when using the current portable electronic device. This makes the user difficult to perform other actions when operating the electronic device. Besides, after a time period of operation, the user may easily feel tired in some parts, such as the hand, the shoulder and the neck or the like.

Therefore, it is desired to provide a new portable electronic device to free both hands of the user, to change the operation gesture of the user, and to bring a better usage experience to the user while reducing the occupied space.

SUMMARY

An object of the embodiments of the present disclosure is to provide an electronic device and a sound capturing method to solve the above mentioned problem.

An electronic device is provided in an embodiment of the present disclosure, comprising: at least one first bone conducting unit, which is operable to detect vibration produced by an object in contact with the first bone conducting unit, and to generate an alternating current signal based on the detected vibration to capture a sound produced by the vibration; and a processing unit, which is operable to receive the alternating current signal and to perform an audio processing on the alternating current signal.

A sound capturing method applied to an electronic device including at least one first bone conducting unit is provided in another embodiment of the present disclosure, the method comprising:

In the electronic device and the sound capturing method according to the embodiments of the present disclosure, the sound produced by the vibration of the object may be captured easily and the audio capturing quality is improved by detecting vibration produced by an object in contact with at least one bone conducting microphone, i.e., the first bone conducting unit, and generating an alternating current signal based on the detected vibration. In addition, since no traditional microphone device for capturing the sound produced by the object through air vibration is necessary in the electronic device, the voice input content of the user to the electronic device may be prevented from being known by others while saving the space occupied by the electronic device.

BRIEF DESCRIPTION OF THE DRAWINGS

To describe the technical solutions of the embodiments of the present disclosure more clearly, the drawings necessary to be used in the description of the embodiments of the present disclosure will be described in brief.

DETAILED DESCRIPTION

Hereinafter the embodiments of the disclosure will be described with reference to the accompanying drawings. It is to be noted that like reference number is used to represent that with substantially like step and element and the repeated explanation for them will be omitted.

Figure 1:
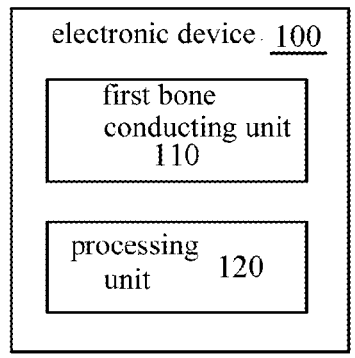
FIG. 1 is a schematic block diagram showing an electronic device according to an embodiment of the present disclosure.

Hereinafter, an electronic device according to an embodiment of the present disclosure will be described with reference to FIG. 1. FIG. 1 is a schematic block diagram showing an electronic device 100 according to an embodiment of the present disclosure. As shown in FIG. 1, the electronic device 100 includes a first bone conducting unit 110 and a processing unit 120.

The first bone conducting unit 110 may detect vibration produced by an object in contact with the first bone conducting unit, and generate an alternating current signal based on the detected vibration to capture a sound produced by the vibration. According to an example of the present disclosure, the first bone conducting unit 110 may be a piezoelectric bone conducting unit. In particular, each of the first bone conducting unit 110 may include a first metal substrate which is arranged in the electronic device 100; and a first piezoelectric sheet which is arranged on a first surface of the electronic device 100.

Specially, the first piezoelectric sheet may have a first piezoelectric sheet surface connected to the first metal substrate, so that the first metal substrate may support the first piezoelectric sheet. Further, the first piezoelectric sheet may also have a second piezoelectric sheet surface arranged on a first surface of the electronic device 100, so as to contact the object whose sound is to be captured. The first piezoelectric sheet may be polarized by the first metal substrate in advance so that a saturated electric field is formed inside of the first piezoelectric sheet. Then, the first piezoelectric sheet is deformed when the object in contact with the first piezoelectric sheet vibrates, resulting in that the charge distribution in the saturated electric field formed in advance in the first piezoelectric sheet is changed and the alternating current signal is generated.

As described above, the first metal substrate may be packed into the electronic device 100 together with the first piezoelectric sheet, so as to support the first piezoelectric sheet. In an alternative embodiment, the first metal substrate may be removed after the first piezoelectric sheet is polarized by the first metal substrate in advance and before the first bone conducting unit 110 is packed into the electronic device 100, so as to make the first bone conducting unit 110 thinner and lighter.

According to an example of the present disclosure, the first bone conducting unit 110 may only include one first piezoelectric sheet and a first metal substrate correspondingly thereto. However, the present disclosure is not limited thereto. According to another example of the present disclosure, the first bone conducting unit 110 may also be a bicrystal or multi-crystal bone conducting unit including more than one piezoelectric sheets and metal substrates each correspondingly to one piezoelectric sheet respectively, so as to increase the detection sensitivity of the first bone conducting unit 110 to the vibration.

Also, according to another example of the present disclosure, the first bone conducting unit 110 may also be a capacitive bone conducting unit. In particular, each of the first bone conducting unit may include a capacitive pressure detecting module and a voltage supply module. The capacitive pressure detecting module may include a metal thin-film electrode and a fixed electrode. The metal thin-film electrode is arranged on the first surface of the electronic device 100, and is operable to be deformed based on the vibration produced by the object. The fixed electrode is arranged in the electronic device, and is connected to the voltage supply module. The voltage supply module is arranged in the electronic device and is connected to the voltage supply module. The voltage supply module is operable to supply power to the capacitive pressure detecting module so that there is a predetermined voltage difference between the metal thin-film electrode and the fixed electrode. Specially, the voltage supply module provides a predetermined voltage to the capacitive pressure detecting module, so that the capacitance formed of the metal thin-film electrode and the fixed electrode has a saturated electricity amount when the object with no vibration contacts the metal thin-film electrode. When the object in contact with the metal thin-film electrode vibrates, the metal thin-film electrode is deformed, and the distance between the metal thin-film electrode and the fixed electrode is changed, which results in a change of a charge distribution on the metal thin-film electrode and the fixed electrode, and thereby the AC signal is generated.

Further, it is to be noted that although the electronic device 100 shown in FIG. 1 only includes one first bone conducting unit, in the embodiment of the present disclosure, the number of the first bone conducting unit is not limited thereto. For example, the electronic device 100 may also include multiple first bone conducting units contacting different parts of the object making sound, so as to capture the sound produced by the vibration of the object more accurately.

The processing unit 120 may receive the alternating current signal and perform an audio processing, such as the audio coding/decoding etc., on the alternating current signal, and obtain the audio signal. According to an example of the present disclosure, after the sensitive electric signal is generated by the first bone conducting unit according to the detected vibration, the sensitive electric signal may be transmitted to the processing unit 120 directly. Alternatively, for convenience of the operation of the processing unit 120, the first bone conducting unit 110 may further include a power amplifying unit, which may amplify the sensitive electrical signal after the sensitive electrical signal is generated by the first bone conducting unit 110 according to the detected vibration, and may transmit the amplified sensitive electrical signal as the AC signal to the processing unit 120.

Also, according to another example of the present disclosure, the processing unit 120 may perform a further operation on the obtained audio signal according to the application currently in operation in the electronic device 100. For example, when the application currently in operation is a voice/video communication application, the processing unit 120 may instruct a communication unit included in the electronic device 100 to transmit the audio signal obtained based on the AC signal from the first bone conducting unit 110 to the other voice/video communication party. For another example, when the application currently in operation is a video play application, the processing unit 120 may perform voice recognition on the AC signal from the first bone conducting unit 110, and obtain a control instruction to the video currently in play according to the recognition result. Also, the electronic device 100 may further include storage so as to store the audio signal after the audio processing by the processing unit 120.

With the electronic device provided by the embodiment of the present disclosure, the sound produced by the vibration of the object may be captured easily by detecting the vibration produced by the object contacting at least one bone conducting microphone, i.e., the first bone conducting unit, and generating the AC signal based on the detected vibration, thereby, the audio capturing quality is improved. Also, since no traditional microphone device for capturing the sound produced by the object through air vibration is necessary in the electronic device, the voice input content of the user to the electronic device may be prevented from being known by others while saving the space occupied by the electronic device. Further, as described above, the electronic device in the embodiment of the present disclosure performs sound capturing by capturing the vibration produced by the objet contacting therewith, thereby decreasing the influence of the surrounding noise to the target sound capture.

Figure 2:
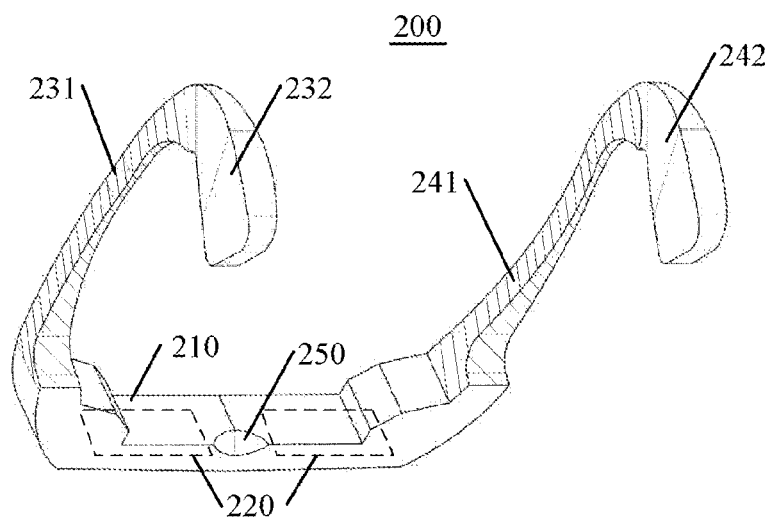
FIG. 2 is an illustration diagram showing an exemplary embodiment of the electronic device shown in FIG. 1.

FIG. 2 is an illustration diagram showing an exemplary embodiment of the electronic device shown in FIG. 1. In the example shown in FIG. 2, the electronic device 200 is a headset electronic device. In particular, the electronic device 200 is a glass electronic device. As shown in FIG. 2, the electronic device 200 includes a frame component 210, a glass component 220 connected to the frame component 210, a fixing unit including a first support arm, a second support arm and a third hold part 250, a processing unit and a first bone conducting unit.

As shown in FIG. 2, the first support arm includes a first connection part 231 as shown by the hatched part in FIG. 2, and a first hold part 232. The first connection part 231 connects the frame component 210 and the first hold part 232. The second support arm includes a second connection part 241 as shown by the hatched part in FIG. 2, and a second hold part 242. The second connection part 241 connects the frame component 210 and the second hold part 242. The third hold part 250 is arranged on the frame component 210. In particular, the third hold part 250 may be arranged at a location between two glass components of the frame component 210. The electronic device 200 is held at the user's head by the first support part 232, the second support part 242 and the third support part 250. In particular, the first hold part 232 and the second hold arm 242 may be used to support the first support arm and the second support arm at the user's ears, and the third hold part 250 may be used to support the frame component 210 at the user's nose bridge.

The first bone conducting unit may be arranged on the third hold part 250. Thereby, when the electronic device 200 is held at the user's head, the first bone conducting unit contacts the user's nose bridge, so as to capture the sound produced by the user by detecting the vibration of the bone at the user's nose bridge when speaking.

Figure 3:
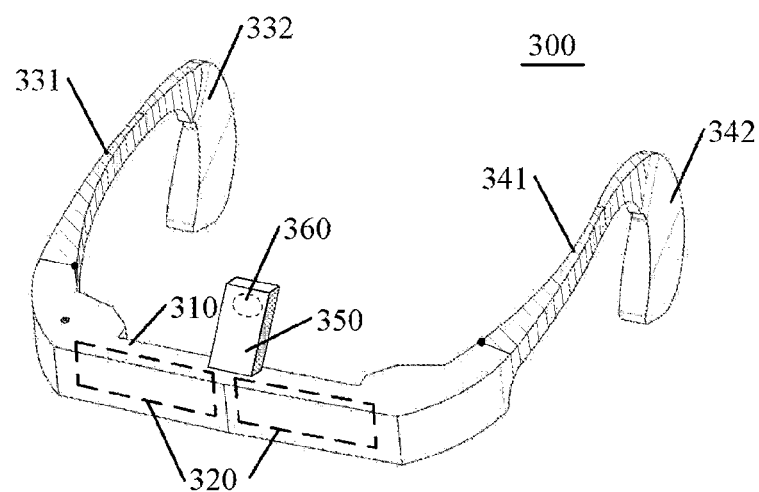
FIG. 3 is an illustration diagram showing another exemplary embodiment of the electronic device shown in FIG. 1.

FIG. 3 is an illustration diagram showing another exemplary embodiment of the electronic device shown in FIG. 1. In the example of FIG. 3, similar to the electronic device 200, the electronic device 300 is also a glass electronic device. As shown in FIG. 3, the electronic device 300 includes a frame component 310, a glass component 320 connected to the frame component 310, a fixing unit including a first support arm, a second support arm and a third hold part (not shown), a fourth support arm 350, a processing unit and a first bone conducting unit 360.

As shown in FIG. 3, similar to the electronic device 200, in the electronic device 300, the first support arm includes a first connection part 331 as shown by the hatched part in FIG. 3 and a first hold part 332. The first connection part 331 connects the frame component 310 and the first hold part 332. The second support arm includes a second connection part 341 as shown by the hatched part in FIG. 3 and a second hold part 342. The second connection part 341 connects the frame component 310 and the second hold part 342. The third hold part is arranged on the frame component 310. In particular, the third hold part may be arranged at a location between the two glass components of the frame component 310. The electronic device 300 is held at the user's head by the first hold part 332, the second hold part 342 and the third hold part 350. In particular, the first hold part 332 and the second hold part 342 may be used to support the first support arm and the second support arm at the user's ears, and the third hold part may be used to support the frame component 310 at the user's nose bridge.

Also, as shown in FIG. 3, a fourth support part 350 is arranged on the frame component. The fourth support part 350 supports the at least one first bone conducting unit, so that the at least one first bone conducting unit contacts the user's forehead when the electronic device is worn at the user's head. Optionally, the fourth support part 350 is a flexible support part. The fourth support part 350 is partially deformed flexibly when the electronic device is worn at the user's head, so that the at least one first bone conducting unit is pressed against the user's forehead. Thereby, when the electronic device 300 is kept at the user's head, the first bone conducting unit is pressed against the user's forehead so as to detect the vibration of the bone at the forehead when the user is speaking to capture the sound produced by the user.

As shown in FIG. 3, a first side of the fourth support part 350 is arranged at a location between the two glass components at the frame component 310. When the electronic device 300 is worn at the user's head, a second side of the fourth support part 350 opposite to the first side presses the first bone conducting unit above the center between the eyebrows. It is to be noted that although the description is made taking an example in which the electronic device 300 includes only one fourth support part 350 located between both eyes of the user in the example of FIG. 3, the present disclosure is not limited thereto. For example, the electronic device 300 may further include multiple fourth support parts 350 arranged at different locations of the frame component 310, so as to press the multiple first bone conducting units against different locations of the user's forehead, so that the vibration produced by the bone of the head when the user is speaking may be captured more accurately. Although the fourth support part 350 is separately arranged at a location of the frame component 310 between the two glass components in FIG. 3, the present disclosure is not limited thereto. For example, for a better appearance, the frame component 310 of the electronic device 300 may be arranged with a broader upper frame, so that the height of the upper edge of the frame component 310 is close to the height of the upper edge of the fourth support part 350, i.e., a side contacting the user's forehead, or is consistent with the height of the upper edge of the fourth support part 350. Optionally, the upper frame of the frame component 310 of the electronic device may be arranged in integration with the fourth support part 350. Further, the frame component 310 of the electronic device 300 may have a broader upper edge which may be bended towards the direction of the user's head when being worn by the user, to function as the fourth support part.

In the examples shown in FIGS. 2 and 3, the processing unit may be arranged in the first support arm and/or the second support arm. The processing unit may receive the AC signal from the first bone conducting unit, and perform the audio processing on the AC signal.

In the current headset electronic device, components such as the display unit, and the processing unit (e.g., the graphic processing unit) or the like are generally integrated into the main body of the headset electronic device. The main body of the electronic device is supported by the user's nose bridge, so that most main body of the electronic device is within the visible region of the user. However, since the main body of the electronic device is generally bulky and heavy which brings a great pressure to the user's nose bridge, makes the user uncomfortable when wearing it, and is easily to be fallen off, the user is not convenient to conduct activities such as moving the head around etc., when wearing such headset electronic device.

In view of this, according to an example of the present disclosure, the processing unit may be arranged in the first hold part and/or the second hold part, so that a first distance from the geometry center of the electronic device to the plane where the glass component is located is smaller than a second distance from the gravity center of the electronic device to the plane where the glass component is located. That is, the gravity center of the headset electronic device is made to be far away from the plane where the glass component is located as much as possible, and to be close to the first hold part and the second hold part, so as to ease the burden carried by the noise bridge when wearing the headset electronic device, and it is convenient for the user to conduct activities such as moving the head around etc., as well as to use and wear it.

Further, according to another example of the present disclosure, the headset electronic device further includes a power supply unit such as a battery or the like. The processing unit may be arranged in the first hold part, and the power supply unit may be arranged in the second hold part, so that the vertical distance of the gravity center of the headset electronic device to the first support arm and that to the second support arm are substantially the same. That is, the gravity center of the headset electronic device is almost in the middle between the first support arm and the second support arm. Thereby, the pressures of both ears are balanced when the user is wearing the headset electronic device.

Figure 4:
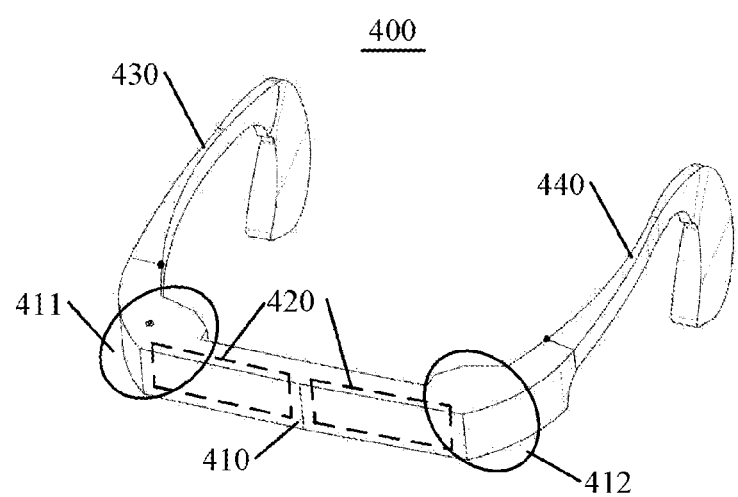
FIG. 4 is an illustration diagram showing still another exemplary embodiment of the electronic device shown in FIG. 1.

Further, according to another embodiment of the present disclosure, the electronic device may further include a first data transmission line and a display unit. FIG. 4 is an illustration diagram showing another exemplary embodiment of the electronic device shown in FIG. 1. Similar to the electronic device 200, the electronic device 400 is a glass electronic device. The electronic device 400 includes a frame component 410, a glass component 420 connected to the frame component 410, a first support arm 430, a second support arm 440, a third hold part, a processing unit and a first bone conducting unit similar to the frame component 210, the glass component 220 connected to the frame component 210, the first support arm, the second support arm, the third hold part, the processing unit and the first bone conducting unit in the electronic device 200, which will not be described here to avoid redundancy. In the present embodiment, the processing unit may further perform video processing and output the first video signal.

Also, in the present embodiment, the electronic device 400 may further include the first data transmission line and the display unit. The first data transmission line may be arranged in the fixing unit and the frame component. The first data transmission line may transmit the first video signal to the display unit. The display unit may display to the user according to the first video signal. In the present embodiment, the first video signal may be a video signal corresponding to the first audio signal. For example, when the user watches a movie through the electronic device 400, the first video signal may be an image signal of the movie, and the first audio signal may be an audio signal of the movie corresponding to the image signal. For another example, when the user conducts a video communication through the electronic device 400, the first video signal may be an image signal from the communication party, and the first audio signal may be an audio signal from the communication party. Alternatively, the first video signal is irrelevant to the first audio signal. For example, the first video signal may be an image signal about a picture, a video image, a text as well as the combination thereof. A separate memory unit may be arranged in the electronic device 400 to store these image files. Alternatively, the electronic device 400 may receive the image file to be displayed from an electronic device connected therewith, such as a computer, a smart phone, and a multimedia player or the like, in wire or wirelessly. For example, the electronic device 400 may further include a communication unit to receive the image file to be displayed from the electronic device such as the computer, the smart phone, and the multimedia player or the like. Further, although the description is made in this embodiment taking the data transmission line as an example, the present disclosure is not limited thereto. For example, according to another example of the present disclosure, the first video signal may be transferred to the display unit wirelessly.

Figure 5:
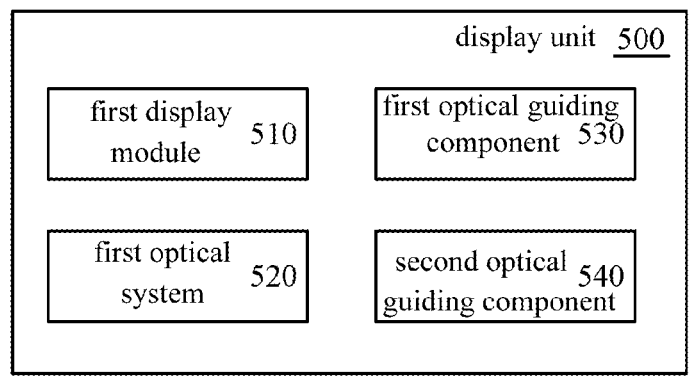
FIG. 5 is a schematic block diagram showing a display unit according to an example of the present disclosure.
Figure 6:
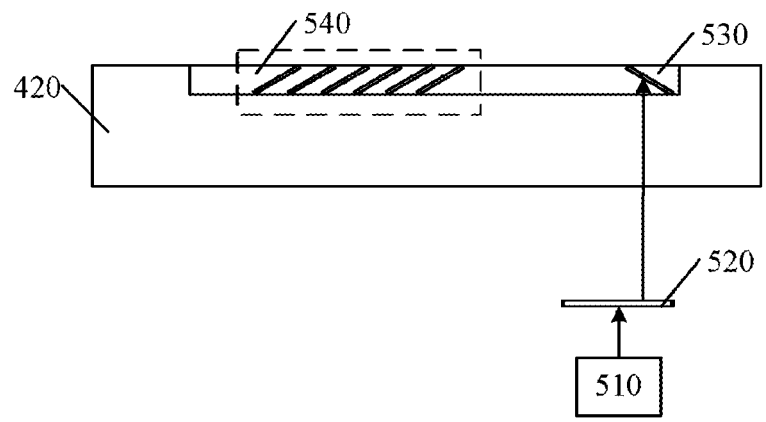
FIG. 6 is an illustration diagram showing an exemplary embodiment of the display unit shown in FIG. 5.

FIG. 5 is a schematic block diagram showing a display unit according to an example of the present disclosure. As shown in FIG. 5, the display unit 500 may include a first display module 510, a first optical system 520, a first optical guiding component 530 and a second optical guiding component 540. FIG. 6 is an illustration diagram showing an exemplary embodiment of the display unit 500 shown in FIG. 5.

The first display module 510 may be arranged in the frame component 410, and is connected to the first data transmission line. The first display module 510 may display a first image based on the first video signal transmitted through the first data transmission line. According to an example of the present disclosure, the first display module 510 may be a display module with a micro display of a small size.

The first optical system 520 may also be arranged in the frame component 410. The first optical system 520 may receive the light emitted from the first display module and change optical path of the light emitted from the first display module to form a first magnified virtual image. That is, the first optical system 520 has a positive reflective power. Thereby, the user can see the first image clearly, and the size of the image seen by the user is not limited by the size of the display unit.

For example, the optical system may include a convex lens. Alternatively, to decrease the interference to the imaging by the abbreviation and the dispersion or the like so as to bring a better visual experience to the user, the optical system may form a lens component formed of multiple lenses including the convex lens and the concave lens. Also, according to an example of the present disclosure, the first display module 510 and the first optical system 520 may be arranged correspondingly along the optical axis of the optical system. Alternatively, according to another example of the present disclosure, the display unit may further include a fifth optical guiding component to transfer the light emitted from the first display module 510 to the first optical system 520.

As shown in FIG. 6, the light emitted from the first display module 510 is received at the first optical system 520. After the light path of the light emitted from the first display module 510 is changed, the first optical guiding component 530 may transfer the light passing the first optical system to a second optical guiding component 540 which may be arranged in the glass component 420. The second optical guiding component 540 may receive the light transferred by the first optical guiding component 530, and reflect the light transmitted by the first optical guiding component 530 to an eye of the user wearing the electronic device.

Back to FIG. 4, optionally, the glass component 420 meets a first predetermined transmittance in the direction from the inner side to the outer side, so that the user may see the surroundings while watching the first magnified virtual image. On the other side, the glass meets a second predetermined transmittance in the direction from the outer side to the inner side, so that it may reflect or refract partial light when the light in the surroundings are strong.

Also, as shown in FIG. 4, according to an example of the present disclosure, the frame component 410 may include a first pile head part 411 connected to the first support arm 430, and a second pile head part 412 connected to the second support arm 440, as shown in the part of the frame component by circle in FIG. 4.

Figure 7:
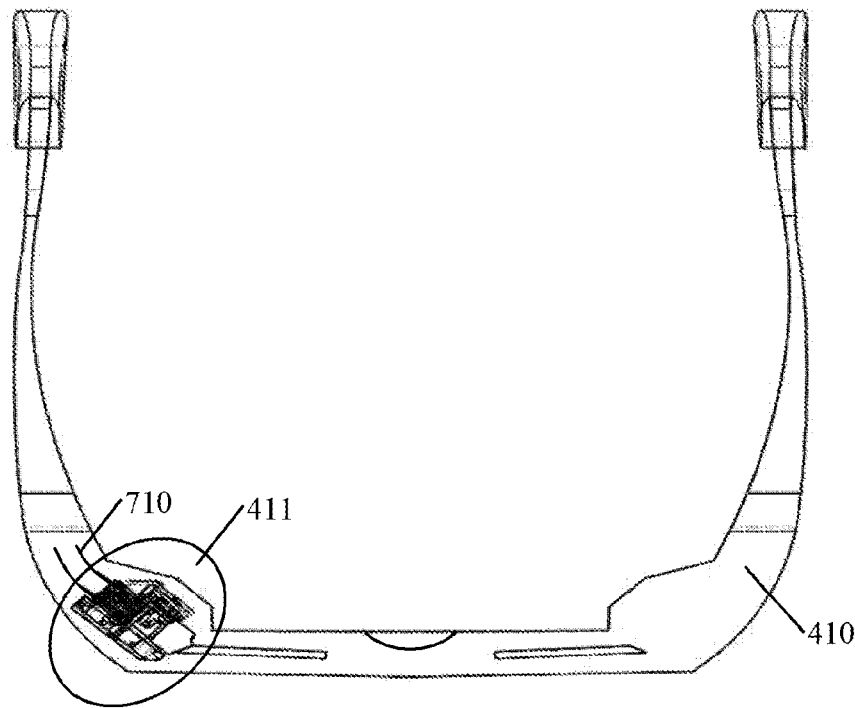
FIG. 7 is a vertical view showing an exemplary embodiment of the electronic device shown in FIG. 4.

FIG. 7 is a vertical view showing an exemplary embodiment of the electronic device shown in FIG. 4, and FIG. 7 shows the inner structure of the frame component 410. As shown in FIG. 7, the first display module and the first optical system in the display unit are arranged in the first pile head part 411 in the frame component 410, and the first display module is connected to the first data transmission line. Also, the glass component 420 is arranged in the frame component 410. As described above, the first optical guiding component may transfer the light passing the first optical system to the second optical guiding component arranged in the glass component 420.

Optionally, in the example shown in FIG. 4, the processing unit may further perform video processing and output the second video signal, wherein the second video signal and the first video signal are the same or different. The electronic device 400 may further include a second data transmission line. The second data transmission line may be arranged in the fixing unit and the frame component to transmit the second video signal to the display unit. The display unit may further include a second display module, a second optical system, a third optical guiding component and a fourth optical guiding component.

The second display module may be arranged in the frame component, and is connected to the second data transmission line. The second display module may display a second image based on the second video signal transmitted through the second data transmission line. According to an example of the present disclosure, the second display module may be a display module with a micro display of a small size.

The second optical system may also be arranged in the frame component. The second optical system may receive the light emitted from the second display module and change optical path of the light emitted from the second display module to form a second magnified virtual image. That is, the second optical system has a positive reflective power. For example, the optical system may include a convex lens. Alternatively, to decrease the interference to the imaging by the abbreviation and the dispersion or the like so as to bring a better visual experience to the user, the optical system may form a lens component formed of multiple lenses including the convex lens and the concave lens. Also, according to an example of the present disclosure, the second display module and the second optical system may be arranged correspondingly along the optical axis of the optical system.

After the second optical system receives the light emitted from the second display module and changes the light path of the light emitted from the second display module, the third optical guiding component may transfer the light passing the second optical system to the fourth optical guiding component. The fourth optical guiding component may be arranged in the glass component. Also, the fourth optical guiding component may receive the light transferred by the third optical guiding component, and reflects the light transferred by the third optical guiding component to the eye of the user wearing the electronic device. As shown in FIG. 4, the glass component 420 may include a first glass for an eye of the user and a second glass for the other eye of the user. The second optical guiding component and the fourth optical guiding component may be arranged in the first glass and the second glass respectively, to enable the user to view with both eyes simultaneously.

Figure 8:
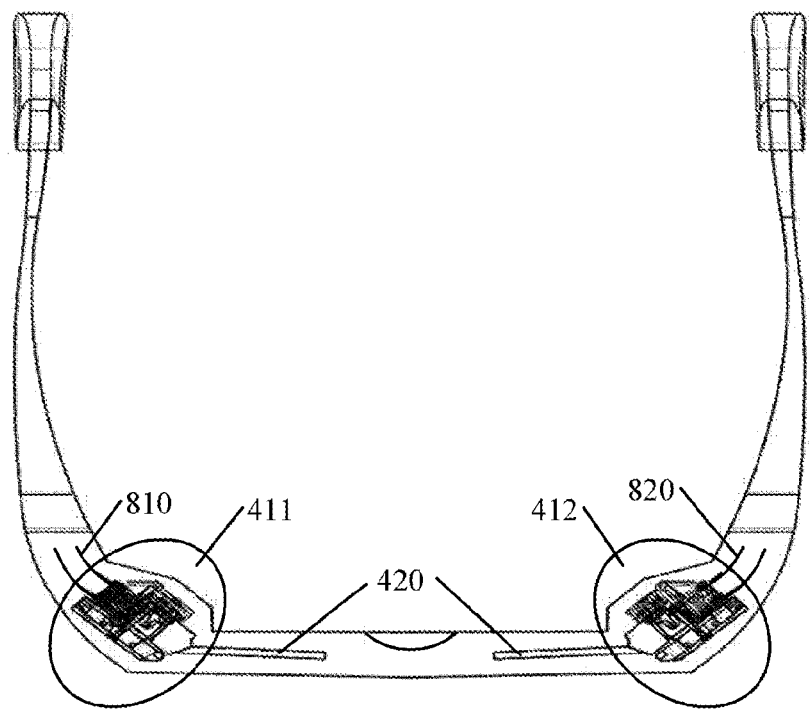
FIG. 8 is a vertical view showing another exemplary embodiment of the electronic device shown in FIG. 4.

Optionally, the second display module and the second optical system are arranged in the second pile head part 412. FIG. 8 is a vertical diagram showing another exemplary embodiment of the electronic device shown in FIG. 4. As shown in FIG. 8, the first display module and the first optical system in the display unit are arranged in the first pile head part 411 of the frame component 410, and the first display module is connected to the first data transmission line 810. Further, the glass component 420 is arranged in the frame component 410. As described above, the first optical guiding component may transfer the light passing the first optical system to the second optical guiding component arranged in the glass component 420.

On the other hand, the second display module and the second optical system are arranged in the second pile head part 412 in the frame component 410, and the second display module is connected to the second data transmission line 820. Also, as described above, the third optical guiding component may transfer the light passing the second optical system to the fourth light guiding component arranged in the glass component 420.

Figure 9:
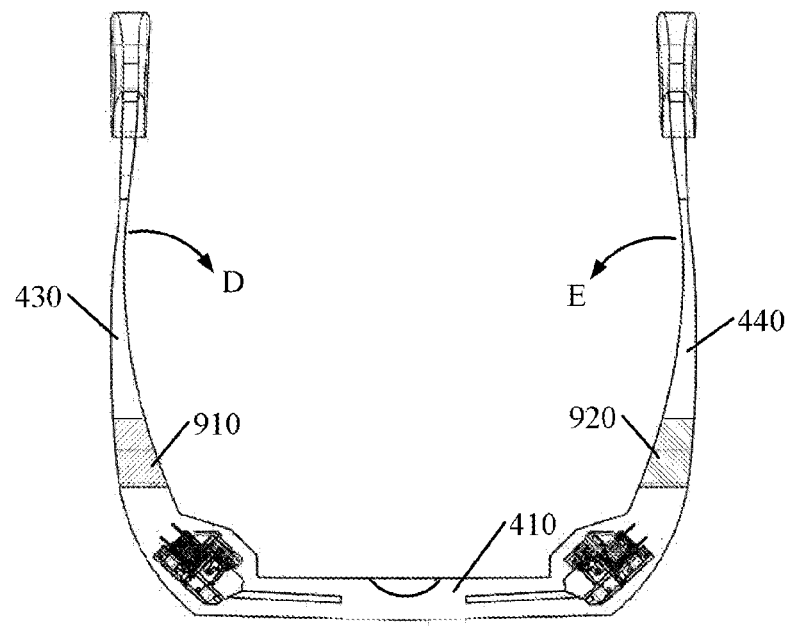
FIG. 9 is a vertical view showing an exemplary embodiment of the electronic device shown in FIG. 8.

Optionally, the support arm and the frame component of the above glass electronic device may be connected through a first flexible area. FIG. 9 is a vertical view showing an exemplary embodiment of the electronic device shown in FIG. 8. As shown in FIG. 9, the first connection part of the first support arm 430 may include a first flexible area 910 connected to the frame component 410 as shown in the hatched part in FIG. 9. The first support arm 430 is capable of bending against the frame component, for example, in the direction shown by the arrow D, through the first flexible area 910. Similarly, the second connection part of the second support arm 440 may include a second flexible area 920 connected to the frame component 410 as shown in the hatched part in FIG. 9. The second support arm 440 is capable of bending against the frame component, for example, in the direction shown by the arrow E, through the second flexible area 920. When the user does not need to wear the electronic device 400, the first support arm 430 and the second support arm 440 may be bended to reduce the space occupied by the electronic device and improves the portability.

Figure 10:
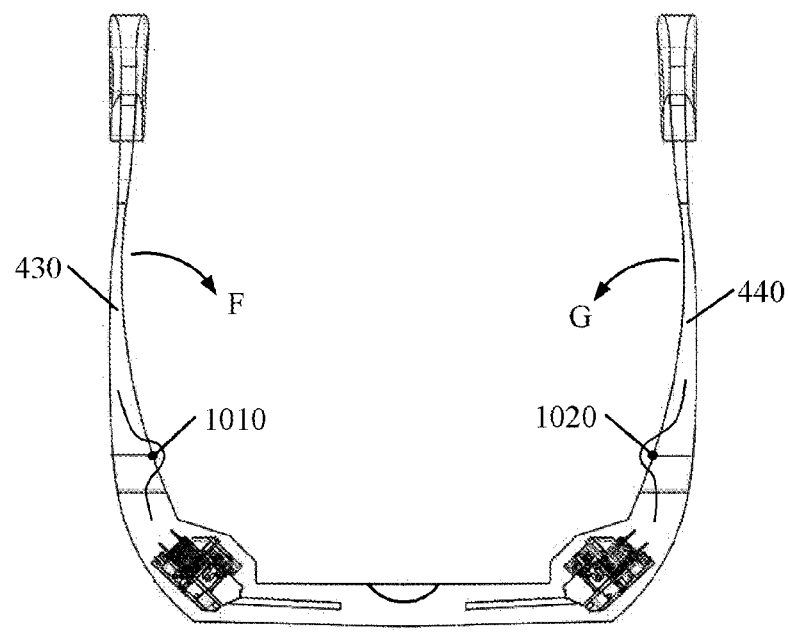
FIG. 10 is a vertical view showing another exemplary embodiment of the electronic device shown in FIG. 8.

Alternatively, the support arm and the frame component of the electronic device 400 may be connected by pivot. FIG. 10 is a vertical diagram showing another exemplary embodiment of the electronic device shown in FIG. 8. As shown in FIG. 10, the first connection part of the first support arm 430 may be connected to the frame component 410 through the first pivot 1010, the first support arm 430 being capable of pivoting around the first pivot 1010, for example, in the direction shown by the arrow F. Similarly, the second connection part of the second support arm 440 may be connected to the frame component 410 through the second pivot 1020, the second support arm 440 being capable of pivoting around the second pivot 1020, for example, in the direction shown by the arrow G.

As shown in FIG. 10, the first data transmission line is arranged in the inner side of the first pivot 1010, i.e., a side close to the user's head, and the second data transmission line is arranged in the inner side of the second pivot 1020, i.e., a side close to the user's head, so that the damage to the first data transmission line and the second data transmission line may be avoided when pivoting the first support arm 430 and the second support arm 440.

Figure 11:
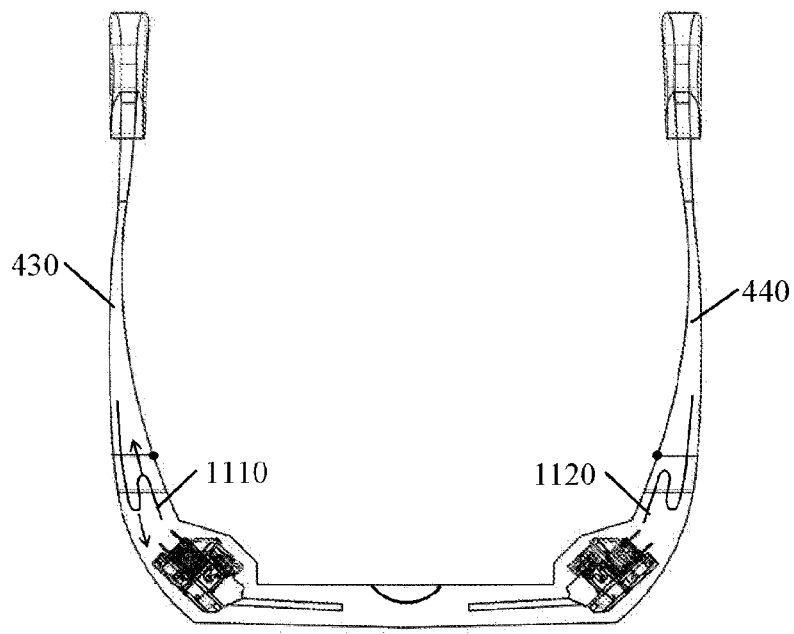
FIG. 11 is a vertical view showing still another exemplary embodiment of the electronic device shown in FIG. 8.

Also, the first data transmission line and the second data transmission line may be bended in the support arm and/or the frame component of the glass electronic device in advance to reserve some tolerance. FIG. 11 is a vertical diagram showing another exemplary embodiment of the electronic device shown in FIG. 8. The first data transmission line 1110 and the second data transmission line 1120 may be bended into the shape shown in FIG. 11 in advance. When the first support arm 430 and the second support arm 440 are bended, the bending shapes of the first data transmission line 1110 and the second data transmission line 1120 may be adjusted automatically, to adapt to the change to the data transmission line by the bending of the first support arm 430 and the second support arm 440. Optionally, a flexibility restraint may be applied to the data transmission line at the middle part of the support arm and/or the frame component, so that the shape of the data transmission line may be adjusted automatically when the user needs to wear the electronic device 400.

Further, according to another embodiment of the present disclosure, the electronic device may also include a second bone conducting unit, and the processing unit may also perform audio processing and output a first audio signal. In the above glass electronic device, the second bone conducting unit may be arranged at the inner side of the first support arm. In an example of the present disclosure, the inner side of the first support arm is a side of the inner side of the first support arm which is close to the user's head when the electronic device is worn at the user's head.

The second bone conducting unit may produce vibration based on the first audio signal from the processing unit, so that the user hears the first audio through the produced vibration. In particular, when the electronic device is worn at the user's head, the second bone conducting unit contacts the user's head so that the user may sense the vibration produced by the second bone conducting unit.

According to an example of the present disclosure, the second bone conducting unit may receive the first audio signal from the processing unit directly, and produce the vibration based on the first audio signal. Alternatively, according to another example of the present disclosure, the electronic device may further include a power amplifying unit arranged in the fixing unit. The power amplifying unit may receive the first audio signal from the processing unit and amplify it. The amplified first audio signal is the AC signal. The power amplifying unit may apply the amplified first audio signal to the second bone conducting unit, which may be driven by the amplified first audio signal to produce vibration.

Figure 12:
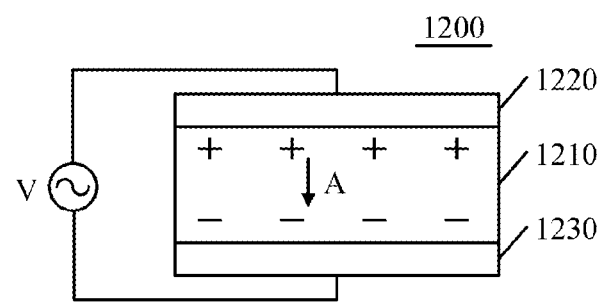
FIG. 12 is a schematic diagram showing a second bone conducting unit according to an example of the present disclosure.

FIG. 12 is a schematic diagram showing a second bone conducting unit according to an example of the present disclosure. As shown in FIG. 12, in an example of the present disclosure, the second bone conducting unit 1200 may include a piezoelectric sheet 1210, an upper metal substrate 1220 arranged above the piezoelectric sheet 1210 correspondingly to the piezoelectric sheet 1210, and a lower metal substrate 1230 arranged below the piezoelectric sheet 1210 correspondingly to the piezoelectric sheet 1210. For example, the piezoelectric sheet 1210 may be a ceramic sheet. The piezoelectric sheet may be polarized in advance, so that a predetermined electronic field is formed inside of the piezoelectric sheet as shown by the arrow A in FIG. 12. When the AC voltage V from the power amplifying unit is applied to the metal substrate, the piezoelectric sheet and the metal substrate are bended as a function of the AC voltage, to produce the vibration according to the first audio signal.

Figure 13A:
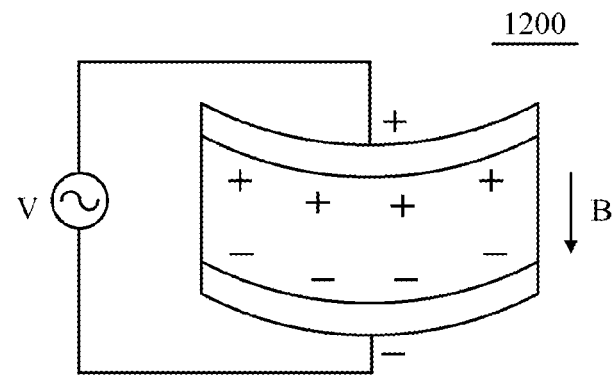
FIG. 13a is an illustration diagram showing a schematic in which the second bone conducting unit is bended as a function of an alternating current voltage according to an example of the present disclosure
Figure 13B:
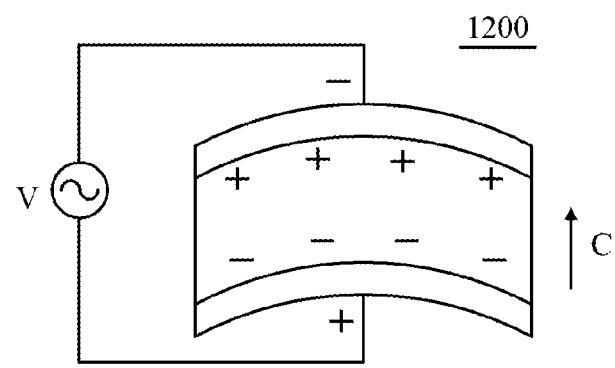
FIG. 13b is an illustration diagram showing a schematic in which the second bone conducting unit is bended as a function of an alternating current voltage according to an example of the present disclosure.

FIGS. 13*a* and 13*b* are illustration diagrams showing a schematic embodiment in which the second bone conducting unit 1200 is bended as a function of the AC voltage according to an example of the present disclosure. As shown in FIG. 13*a*, the piezoelectric sheet and the metal substrate of the second bone conducting unit 1200 are bended in the direction as shown by the arrow B when the direction of the electric field formed by the AC voltage from the power amplifying unit is the same as the direction of the predetermined electric field formed in the piezoelectric sheet. On the other side, as shown in FIG. 13*b*, the piezoelectric sheet and the metal substrate of the second bone conducting unit 1200 are bended in the direction as shown by the arrow C when the direction of the electric field formed by the AC voltage from the power amplifying unit is the opposite to the direction of the predetermined electric field formed in the piezoelectric sheet. That is, the second bone conducting unit is quickly bended according to the first audio signal output from the processing unit to produce vibration.

Optionally, the length and the thickness of the piezoelectric sheet may be set according to the necessary deformation displacement amount of the second bone conducting unit applied with the AC voltage. When the necessary deformation displacement amount is larger, the length of the piezoelectric sheet may be set longer, and the thickness thereof may be set thinner. Also, when the necessary deformation displacement amount is larger, the magnification factor of the power amplifying unit may be set larger.

Also, according to another example of the present disclosure, the second bone conducting unit may also include an insulating flexible protection layer covering the upper layer of the metal substrate, such as a silica gel or the like. When the electronic device is worn at the user's head, the user's head contacts the insulating flexible protection layer.

Also, FIG. 12 is a schematic diagram showing a monocrystal bone conducting unit including one piezoelectric sheet and a corresponding metal substrate. However, the present disclosure is not limited thereto. According to another example of the present disclosure, the bicrystal or multicrystal bone conducting unit including more than one piezoelectric sheets and metal substrates each corresponding to a piezoelectric sheet may be adopted.

In the embodiment shown in FIG. 12, a description is made taking the bone conducting unit based on the piezoelectric sheet and the metal substrate as an example, however, the present disclosure is not limited thereto. According to another example of the present disclosure, the second bone conducting unit may include a voice coil, a magnet and a vibration film. The first audio signal from the processing unit may be provided to the voice coil directly. Alternatively, the electronic device may further include a power amplifying unit arranged in the fixing unit. The power amplifying unit may receive the first audio signal from the processing unit and amplify it. In the present example, the amplified first audio signal is the AC signal. The power amplifying unit may apply the amplified first audio signal to the voice coil in the second bone conducting unit. When the audio signal passes through the voice coil located in the magnetic field formed by the magnet, a magnetic field changing with the audio current is generated. The changing magnetic field and the magnetic field formed by the magnet interact with each other and generate a driving force to make the voice coil and the vibration film connected thereto vibrate.

With the electronic device provided by the embodiment of the present disclosure, not only the sound generated by the user may be captured accurately by the bone conducting microphone (i.e., the first bone conducting unit), but also the audio may be played to the user by using the bone conducting speaker arranged at the inner side of the electronic device (i.e., the second bone conducting unit) to improve the audio output quality. Further, since no traditional audio play unit such as the speaker and the earphone or the like is necessary in the electronic device, the content heard by the user is prevented from being known by others while saving the space occupied by the electronic device.

Further, according to an example of the present disclosure, the electronic device according to an embodiment of the present disclosure may further include a first touch sensitive unit for receiving the touch input of the user and transmitting the touch detection result to the processing unit so that the processing unit generates a corresponding control instruction. In the above glass electronic device, the first touch sensitive unit may be arranged at the outer side of the first connection part which is a side of the connection part away from the user's head when the electronic device is worn at the user's head. Alternatively, in the first connection part, the first touch sensitive unit is arranged correspondingly to at least a part of the second bone conducting unit, and the first data transmission line is located between the first touch sensitive unit and the second bone conducting unit. Further, optionally, there is a predetermined distance between the second data transmission line and the plane where the touch panel of the first touch sensitive unit is located, to prevent the photo magnetic interference to the detection of the first touch sensitive unit by the first data transmission line.

Figure 14:
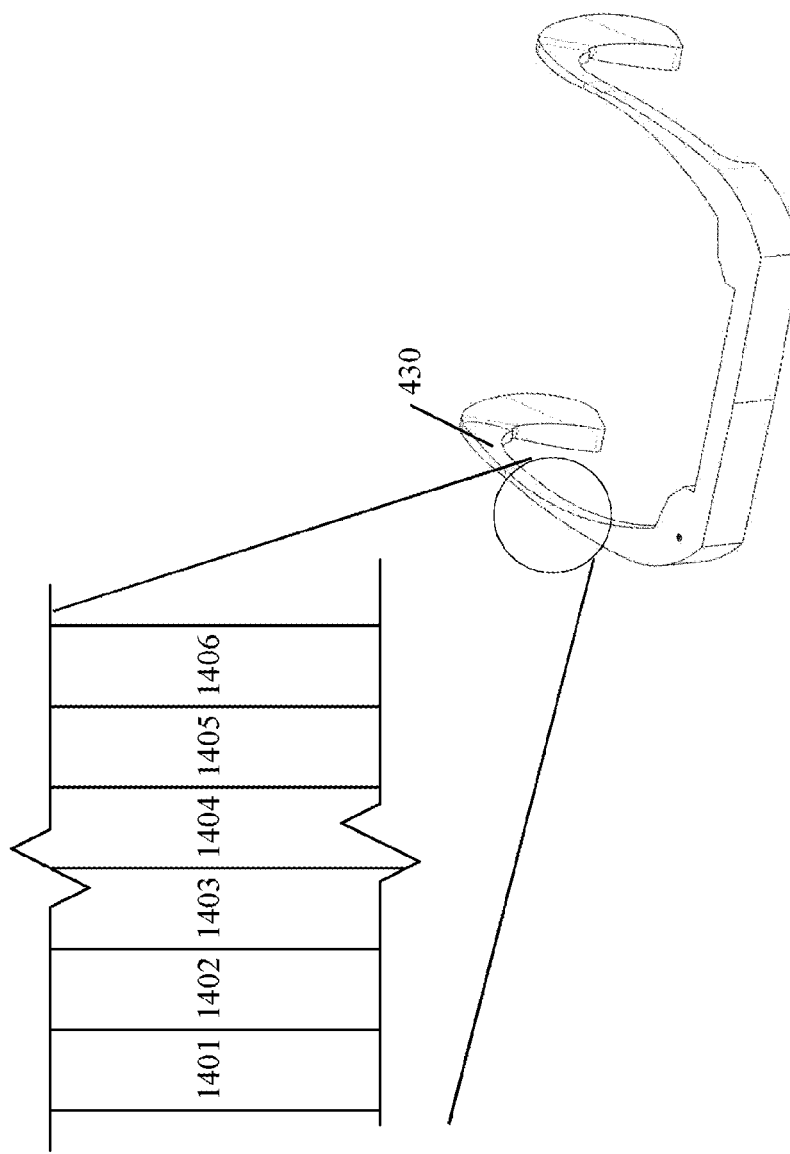
FIG. 14 is an amplified partial sectional diagram showing a first support arm 430 of the electronic device shown in FIG. 4.

FIG. 14 is an amplified partial sectional diagram showing the first support arm 430 of the electronic device shown in FIG. 4. As shown in FIG. 14, a cover layer 1401 of the second bone conducting unit contacting the user's head, a bone conducting layer 1402 of the second bone conducting unit (e.g., the piezoelectric sheet and the metal substrate as described above), the first data transmission line 1403, the interval layer 1404 between the first data transmission line 1403 and the touch sensitive layer 1405 of the first touch sensitive unit (e.g., the touch sensitive panel), the touch sensitive layer 1405 of the first touch sensitive unit and the cover layer 1406 of the first touch sensitive unit may be arranged sequentially from the inner side of the first support arm 430 (i.e., a side close to the user's head when the electronic device is worn at the user's head) to the outer side of the first support arm 430 (i.e., a side far away from the user's head when the electronic device is worn at the user's head). With this structure, the locations of the second bone conducting unit and the first touch sensitive unit on the electronic device are set properly, the product appearance design of the electronic device is optimized while improving the audio output quality, and it is convenient for the user to use and operate.

Figure 15:
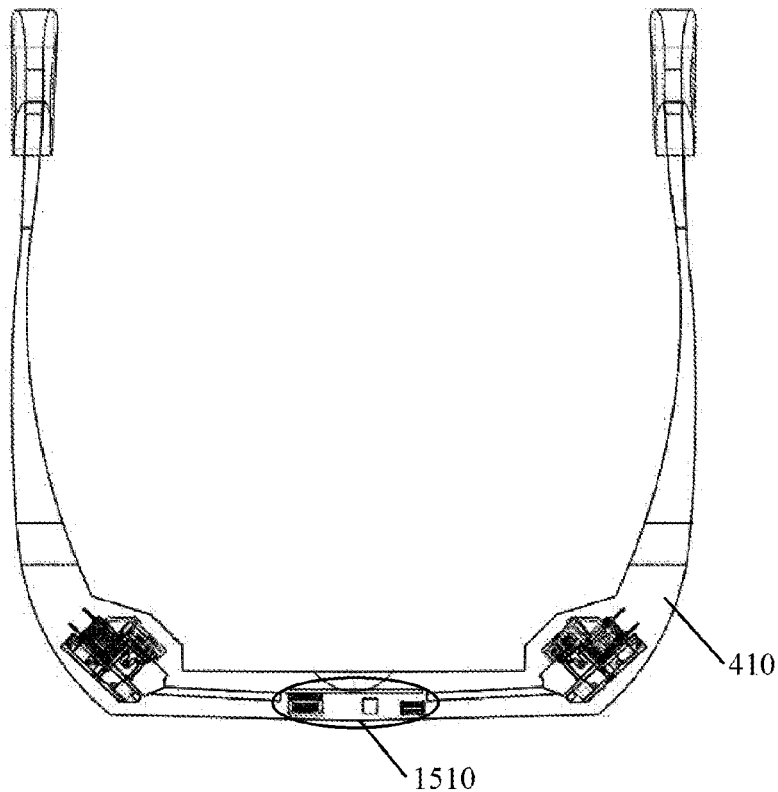
FIG. 15 is a vertical view showing a further exemplary embodiment of the electronic device shown in FIG. 4.

Also, according to another example of the present disclosure, the electronic device according to an embodiment of the present disclosure may further include a capturing unit. FIG. 15 is a vertical diagram showing still another exemplary embodiment of the electronic device shown in FIG. 4. As shown in FIG. 15, the capturing unit 1510 may be arranged at a location of the frame component 410 between both eyes when the electronic device is worn at the user's head. According to an example of the present disclosure, the capturing unit 1510 may include an image capturing unit, a sound capturing unit and/or a near distance sensitive module etc. Therefore, the electronic device according to the embodiment of the present disclosure may perform operations such as imaging and photographing or the like by the capturing unit 1510. For example, the capturing unit 1510 may capture the image on an operation object such as a user's hand, and transmit the captured image to the processing unit of the electronic device, so that the processing unit may generate a corresponding control instruction based on the action of the operation object. In FIG. 15, the description is made taking an example in which the capturing unit is arranged at a location of the frame component between both eyes when the electronic device is worn at the user's head, however, the present disclosure is not limited thereto. For example, the capturing unit may include multiple capturing modules arranged on the frame component. In particular, the image capturing unit, the sound capturing unit and/or the near distance sensitive module etc. may be arranged in the first pile head part and the second pile head part of the frame component symmetrically.

Figure 16:
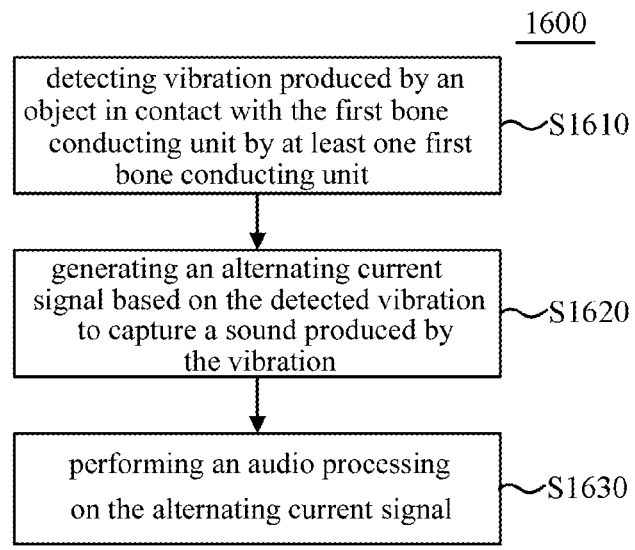
FIG. 16 is a flowchart diagram describing a sound capturing method according to an embodiment of the present disclosure.

In the following, a sound capturing method according to an embodiment of the present disclosure will be described with reference to FIG. 16. FIG. 16 is a flowchart diagram showing a sound capturing method 1600 according to an embodiment of the present disclosure, which is applied to the electronic device described above with reference to the above figures. As described above, the electronic device according to the embodiment of the present disclosure may include at least one first bone conducting unit. Optionally, the electronic device can be worn at the user's head by the fixing unit. The first bone conducting unit may be arranged at a part of the electronic device contacting the user's nose bridge or the forehead when the electronic device is worn at the user's head. The electronic device according to the embodiment of the present disclosure has been described above in detail with reference to the figures, and will not be described here for the sake of brief.

As shown in FIG. 16, in Step S1610, the vibration produced by an object in contact with the first bone conducting unit is detected by the at least one first bone conducting unit. In Step S1620, an alternating current signal is generated based on the detected vibration to capture a sound produced by the vibration. As described above, the first bone conducting unit may be a piezoelectric bone conducting unit including a first piezoelectric sheet and a first metal substrate correspondingly to the first piezoelectric sheet. In this case, in Steps S1610 and S1620, the first piezoelectric sheet is deformed when the object in contact with the first piezoelectric sheet vibrates, resulting in that the charge distribution in the saturated electric field formed in the first piezoelectric sheet in advance is changed and the alternating current signal is generated. Also, as described above, the first bone conducting unit may also be a capacitive bone conducting unit including a metal thin film electrode and a fixing electrode. In this case, in Steps S1610 and S1620, the metal thin film electrode is deformed based on the vibration of the object contacting therewith, so that the charge distribution between the metal thin film electrode and the fixing electrode changes to generate the AC signal.

In Step S1630, an audio processing such as an audio coding/decoding etc., is performed on the alternating current signal generated in Step S1620. Further, according to another example of the present disclosure, after the audio processing on the generated AC signal in Step S1630, the method shown in FIG. 16 may also include performing a further operation on the obtained audio signal based on the application currently in play in the electronic device. For example, when the application currently in play is a voice/video communication application, the method shown in FIG. 16 may further include instructing the communication unit included in the electronic device to transmit the audio signal obtained based on the AC signal from the first bone conducting unit to the voice/video communication party. For another example, when the application currently in play is a video play application, the method shown in FIG. 16 may include performing voice recognition on the AC signal from the first bone conducting unit, and obtaining a control instruction to the video currently in play based on the recognition result. Also, the electronic device may further include a memory unit for storing the audio signal after the audio processing in Step S1630.

With the sound capturing method provided in the embodiment of the present disclosure, the sound produced by the vibration of the object may be captured easily by detecting the vibration produced by the object contacting at least one bone conducting microphone, i.e., the first bone conducting unit, and generating the AC signal based on the detected vibration, thereby, the audio capturing quality is improved. Also, since no traditional microphone device for capturing the sound produced by the object through air vibration is necessary in the electronic device, the voice input content of the user to the electronic device may be prevented from being known by others while saving the space occupied by the electronic device. Further, as described above, the electronic device in the embodiment of the present disclosure performs sound capturing by capturing the vibration produced by the objet contacting therewith, thereby decreasing the influence of the surrounding noise to the target sound capture.

Those of ordinary skill in the art may appreciate that the units and the algorithm steps of the examples described with reference to the embodiments of the present disclosure may be realized in electrical hardware, computer software or the combination thereof. To clearly clarify the exchangeability of the hardware and the software with each other, the components and the steps of the examples are described in general according to the function in the above description. It depends on the specific application and design restraint of the technical solution whether the functions are realized in hardware or software. Those skilled in the art may realize the described function using different methods to a certain specific application, which should not be considered to go beyond the scope of the present disclosure.

Those skilled in the art should understand that various modifications, combinations, sub-combinations and alternations may be made to the present disclosure depending on the design requirement and other factors, as long as they are within the scope of the attached claims and its equivalents.

The invention claimed is:

1. An electronic device, comprising:
   at least one first bone conducting unit, which is operable to detect vibration produced by an object in contact with the first bone conducting unit, and to generate an alternating current signal based on the detected vibration to capture a sound produced by the vibration; and
   a processing unit, which is operable to receive the alternating current signal and to perform an audio processing on the alternating current signal,
   wherein each of the first bone conducting units is formed in a first form or a second form;
   in the first form, each of the first bone conducting unit comprises:
      a first metal substrate which is arranged in the electronic device; and
      a first piezoelectric sheet which is arranged on a first surface of the electronic device;
      the first piezoelectric sheet is polarized by the first metal substrate in advance so that a saturated electric field is formed inside of the first piezoelectric sheet;
      the first piezoelectric sheet is deformed when the object in contact with the first piezoelectric sheet vibrates and the alternating current signal is generated by the electric field inside of the first piezoelectric sheet;
   in the second form, each of the first bone conducting unit comprises:
      a capacitive pressure detecting module including:
         a metal thin-film electrode which is arranged on a first surface of the electronic device, and is operable to be deformed based on the vibration produced by the object; and
         a fixed electrode which is arranged in the electronic device, and is connected to a voltage supply module;
      the voltage supply module is operable to supply power to the capacitive pressure detecting module so that there is a predetermined voltage difference between the metal thin-film electrode and the fixed electrode.

2. The electronic device of claim 1, further comprising:
   a frame component;
   a glass component connected to the frame component; and
   a fixing unit through which the electronic device can be worn at a user's head, including:
      a first support arm including a first connection part and a first hold part, the first connection part being operable to connect the frame component and the first hold part;
      a second support arm including a second connection part and a second hold part, the second connection part being operable to connect the frame component and the second hold part; and
      a third hold part arranged on the frame component, which is in connect with the user's nose bridge when the electronic device is worn at the user's head;
   wherein the first hold part, the second hold part and the third hold part are operable to hold the electronic device at the user's head.

3. The electronic device of claim 2, wherein the first bone conducting unit is arranged on the third hold part.

4. The electronic device of claim 2, further comprising at least one fourth support part arranged on the frame component, which is operable to support the at least one first bone conducting unit, so that the at least one first bone conducting unit contacts the user's forehead when the electronic device is worn at the user's head.

5. The electronic device of claim 4, wherein the at least one fourth support part is a flexible support part, which is partially deformed flexibly when the electronic device is worn at the user's head, so that the at least one first bone conducting unit is pressed against the user's forehead.

6. The electronic device of claim 2, wherein the processing unit is further operable to perform a video processing and to output a first video signal; and the electronic device further comprises:
   a first data transmission line arranged in the fixing unit and the frame component, which is operable to transmit the first video signal to a display unit; and
   the display unit, including:
      a first display module arranged in the frame component, which is operable to display a first image based on the first video signal transmitted through the first data transmission line;
      a first optical system arranged in the frame component, which is operable to receive light emitted from the first display module and to change optical path of the light emitted from the first display module to form a first magnified virtual image;
      a first optical guiding component which is operable to transfer the light passing the first optical system to a second optical guiding component; and
      the second optical guiding component arranged in the frame component, which is operable to reflect the light transferred by the first optical guiding component to an eye of the user wearing the electronic device.

7. The electronic device of claim 6, wherein the frame component comprises:

a first pile head part connected to the first support arm; and a second pile head part connected to the second support arm;

the first display module and the first optical system are arranged in the first pile head part.

8. The electronic device of claim 6, wherein the processing unit is further operable to perform the audio processing and to output a first audio signal;

the electronic device further comprises:
a second bone conducting unit arranged at the inner side of the first support arm, which is operable to produce vibration based on the first audio signal so that the user hears the first audio through the produced vibration;
the inner side of the first support arm being a side of the first support arm close to the user's head when the electronic device is worn at the user's head.

9. The electronic device of claim 8, further comprising a power amplifying unit arranged in the first support arm, which is operable to amplify the first audio signal and to apply the amplified first audio signal as the alternating current signal to the second bone conducting unit; wherein the second bone conducting unit is arranged at the inner side of the first connection part of the first support arm, and produces vibration based on the alternating current signal.

10. The electronic device of claim 9, wherein the second bone conducting unit further comprises:
a second metal substrate connected to the power amplifying unit; and
a second piezoelectric sheet arranged correspondingly to the second metal substrate;
the second piezoelectric sheet being polarized in advance so that a predetermined electric field is formed inside of the second piezoelectric sheet; and
the second piezoelectric sheet and the second metal substrate being bended as a function of the alternating current signal when an alternating current voltage is applied to the second metal substrate, so as to produce vibration based on the first audio signal.

11. The electronic device of claim 8, further comprising a first touch sensitive unit arranged at the outer side of the first connection part which is a side of the connection part away from the user's head when the electronic device is worn at the user's head.

12. The electronic device of claim 11, wherein in the first connection part, the first touch sensitive unit is arranged correspondingly to at least a part of the second bone conducting unit, and the first data transmission line is located between the first touch sensitive unit and the second bone conducting unit; and there is a predetermined distance between the first data transmission line and the plane where the touch sensitive panel of the first touch sensitive unit locates.

13. The electronic device of claim 6, wherein
the first connection part includes a first flexible area connected to the frame component, the first support arm being capable of bending against the frame component through the first flexible area; and
the second connection part includes a second flexible area connected to the frame component, the second support arm being capable of bending against the frame component through the second flexible area.

14. The electronic device of claim 6, further comprising:
a first pivot through which the first connection part is connected to the frame component, the first support arm being capable of pivoting around the first pivot; and
a second pivot through which the second connection part is connected to the frame component, the second support arm being capable of pivoting around the second pivot;
wherein the first data transmission line is arranged along the inner side of the first pivot.

15. The electronic device of claim 2, wherein the processing unit is arranged in the first hold part and/or the second hold part, so that a first distance from the geometry center of the electronic device to the plane where the glass component is located is smaller than or equal to a second distance from the gravity center of the electronic device to the plane where the glass component is located.

16. The electronic device of claim 2, wherein the processing unit is arranged in the first hold part; and the electronic device further comprises a power supply unit arranged in the second hold part.

17. The electronic device of claim 2, further comprising a capturing unit arranged at a location of the frame component between both eyes when the electronic device is worn at the user's head.

18. A sound capturing method applied to an electronic device including at least one first bone conducting unit, the method comprising:
detecting vibration produced by an object in contact with the first bone conducting unit by the at least one first bone conducting unit;
generating an alternating current signal based on the detected vibration to capture a sound produced by the vibration; and
performing an audio processing on the alternating current signal,
wherein each of the first bone conducting units is formed in a first form or a second form;
in the first form, each of the first bone conducting unit comprises:
a first metal substrate arranged in the electronic device; and
a first piezoelectric sheet arranged on a first surface of the electronic device:
the first piezoelectric sheet is polarized by the first metal substrate in advance so a saturated electric field is formed inside of the first piezoelectric sheet;
the first piezoelectric sheet is deformed when the object in contact with the first piezoelectric sheet vibrates and the alternating current signal is generated by the electric field inside of the first piezoelectric sheet;
in the second form, each of the first bone conducting unit comprises:
a capacitive pressure detecting module including:
a metal thin-film electrode arranged on a first surface of the electronic device, and is operable to be deformed based on the vibration produced by the object; and
a fixed electrode arranged in the electronic device, and is connected to a voltage supply module;
the voltage supply module is operable to supply power to the capacitive pressure detecting module so that there is a predetermined voltage difference between the metal thin-film electrode and the fixed electrode.

* * * * *